US008745812B2

(12) United States Patent
Kruse et al.

(10) Patent No.: US 8,745,812 B2
(45) Date of Patent: Jun. 10, 2014

(54) MULTI-COMPONENT WIPER ARM

(75) Inventors: Michael Kruse, Buehl (DE); Stephan Geise, Ruethen (DE)

(73) Assignee: Robert Bosch GmbH, Stuttgart (DE)

( * ) Notice: Subject to any disclaimer, the term of this patent is extended or adjusted under 35 U.S.C. 154(b) by 626 days.

(21) Appl. No.: 12/915,748

(22) Filed: Oct. 29, 2010

(65) Prior Publication Data

US 2011/0113582 A1 May 19, 2011

(30) Foreign Application Priority Data

Oct. 29, 2009 (DE) ......................... 10 2009 046 164

(51) Int. Cl.
*B60S 1/40* (2006.01)

(52) U.S. Cl.
USPC ................. 15/250.32; 15/250.34; 15/250.351

(58) Field of Classification Search
None
See application file for complete search history.

(56) References Cited

U.S. PATENT DOCUMENTS 3,867,737 A * 2/1975 Arman ....................... 15/250.46
3,928,887 A * 12/1975 Lopez et al. ............... 15/250.32
3,942,212 A * 3/1976 Steger et al. ............. 15/250.201
4,360,942 A * 11/1982 Dal Palu' ................... 15/250.46
2006/0068206 A1* 3/2006 Hala et al. .................. 428/411.1

* cited by examiner

*Primary Examiner* — Edmund H. Lee

(74) *Attorney, Agent, or Firm* — Michael Best & Friedrich LLP

(57) ABSTRACT

The present invention relates to a process for producing a wiper arm for a window wiper device for a motor vehicle, with an upper arm portion, on which a mount is provided, in order to fix the wiper arm detachably to a wiper drive of the window wiper device, and a lower arm portion, which is pivotably connected to the upper arm portion, as well as at least one wiper blade holder which is pivotably connected to the lower arm portion, characterized by producing the wiper arm in a multi-component injection-molding process in which, in a first process step, the upper arm portion is injection-molded along with at least one first pivot pin formed on it by means of a first material component in a partial portion of a cavity, in a second process step the lower arm portion, pivotably connected to the upper arm portion, is injection-molded along with at least one second pivot pin formed on it by means of a second material component in a second partial portion of the cavity by encapsulation of the first pivot pin, and in a further process step at least one wiper blade holder is injection-molded by means of a third material component in a further partial portion of the cavity by encapsulation of the second pivot pin.

7 Claims, 2 Drawing Sheets

1
2
7
4
6
5
3
8
8
6
5
8
5
8

MULTI-COMPONENT WIPER ARM

BACKGROUND OF THE INVENTION

The present invention relates to a process for producing a multi-component wiper arm for a window wiper device for a motor vehicle, with an upper arm portion, on which a mount is provided, in order to fix the wiper arm detachably to a wiper drive of the window wiper device, and a lower arm portion, which is pivotably connected to the upper arm portion, as well as at least one wiper blade holder, which is pivotably connected to the lower arm portion. Furthermore, the present invention relates to a wiper arm produced by means of a multi-component assembly injection-molding process.

It is already known to produce the connection of a wiper arm to its various components separately by the injection-molding process and connect them to one another in a further working step. In the prior art, the various subassemblies of the wiper arm are normally first produced in different injection molds on separate injection-molding machines. Subsequently, the individual components produced in this way are assembled to form a wiper arm. The subsequent fitting of the wiper blade to the wiper arm produced in this way may be performed for example by way of clip connections. For this purpose, a corresponding supporting bracket is first injection-molded from plastic and depressions or pins are thereby made in or molded onto the supporting bracket to form the connecting points. In a further process step, the wiper blade is then clipped into these depressions or pins with correspondingly formed projections or recesses.

SUMMARY OF THE INVENTION

However, this kind of production and assembly of the wiper arm is very time-intensive and involves high costs because of the non-productive times caused by the closer necessary injection-molding machines and the additional assembly. The necessity for the individual components to be clipped to one another during the assembly causes the risk of unwanted detachment of the individual components from one another during the operation of the window wiper arm.

It is therefore an object of the present invention to provide a wiper arm which can be produced easily and quickly and at the same time has great reliability and stability during operation.

At the same time, it is an object of the present invention to provide a corresponding process for producing a multi-component wiper arm for a window wiper device of a motor vehicle.

This object is achieved according to the invention by the wiper arm being produced in a multi-component injection-molding process in which, in a first process step, the upper arm portion is injection-molded along with at least one first pivot pin formed on it by means of a first material component in a partial portion of a cavity, in a second process step the lower arm portion, pivotably connected to the upper arm portion, is injection-molded along with at least one second pivot pin formed on it by means of a second material component in a second partial portion of the cavity by encapsulation of the first pivot pin, and in a further process step at least one wiper blade holder is injection-molded by means of a third material component in a further partial portion of the cavity by encapsulation of the second pivot pin.

In order to be able to carry out the production of the multi-component wiper arm according to the invention in only a single cavity, and consequently in a single injection-molding machine, one configurational variant of the present invention proposes that, for the production of the upper arm portion, in a first process step a first material component, in particular a first thermoplastic material, is injected into a first partial portion of the cavity, subsequently a further part of the cavity is freed for the production of the lower arm portion by means of a second material component that is different from the first material component, in particular a second thermoplastic material, the already injection-molded upper arm portion forming at least part of a delimitation of the partial portion of the cavity that is to be used for the injection-molding of the lower arm portion for the production of the lower arm portion. Of course it is possible, in the second phase of the process, to encapsulate the pivot pin of the upper arm portion at least partially with the second material component during the injection-molding in such a way that a movable connection between the upper arm portion and the lower arm portion is obtained at the pivot pin of the upper arm portion.

After that, in a third process step, at least one wiper blade holder may be produced by injection-molding a third material component, in particular a third thermoplastic material, the lower arm portion forming at least part of a delimitation of the partial portion of the cavity that is used for the injection-molding of the wiper blade holder, and, in the third process step, the pivot pin of the lower arm portion at the same time being encapsulated at least partially with the third material component in such a way that a movable connection between the lower arm portion and the wiper blade holder is obtained.

A particularly simple and low-cost variant of the process according to the invention envisages using the same material component, in particular the same thermoplastic material, for the production of the upper arm portion and the wiper blade holder, the thermoplastic material of the upper arm portion and the wiper blade holder being made to match the thermoplastic material of the lower arm portion in such a way that the two different types of plastic do not bond to each other.

If the two plastics are then also chosen such that they have different shrinkage behaviors, and that as a result a defined distance is obtained between the pivot pin of the upper arm portion and the lower arm portion as well as the pivot pin of the lower arm portion and the wiper blade holder, a particularly elegant kind of stable and movable connection can be accomplished between the respective pivot pin and the subassemblies.

A complete injection-molding cycle according to the invention for the production of a wiper arm may have the following steps:

- injecting a first thermoplastic component into part of a cavity for the forming of an upper wiper arm;
- opening a second partial portion of the cavity in the injection mold;
- injecting a second thermoplastic component for the partial encapsulation of a pivot pin, produced during the first injection-molding process, on the upper arm portion for the forming of a pivot;
- freeing a third cavity portion for the production of a wiper blade holder;
- injecting the first thermoplastic component, which flows around the freed pivot pins of the lower arm portion, in order to provide a movable mounting of the wiper blade holder;
- cooling down of the cavity;
- removal of the completely assembled wiper arm from the cavity.

A wiper arm according to the invention for a window wiper device of a motor vehicle has an upper arm portion, a lower arm portion and at least one wiper blade holder, the upper arm portion being pivotably connected to the lower arm portion and the lower arm portion being pivotably connected to the wiper blade holder.

The wiper arm may provide a detachable fixing of the wiper arm to the window wiper device by way of at least one mount formed on the upper arm portion. According to the invention, the upper arm portion and the lower arm portion as well as the wiper blade holder of the wiper arm according to the invention are produced by means of a multi-component assembly injection-molding process.

In this case, the lower arm portion and the upper arm portion may be produced from two different types of thermoplastic material, it also being possible for the plastics to be chosen such that they do not bond to each other during or after the injection-molding.

The thermoplastic materials of the upper arm portion and the lower arm portion or the wiper blade holder may have different shrinkage properties, which may be chosen such that a previously specified clearance of a fit and/or a width of a gap that can be set in advance by way of the shrinkage properties of the plastics is/are obtained in the pivoted connections between the upper arm portion and the lower arm portion and/or the lower arm portion and the wiper blade holder.

With regard to further advantageous refinements of the invention, reference is made to the subclaims and to the accompanying drawing.

DETAILED DESCRIPTION

Figure 1:
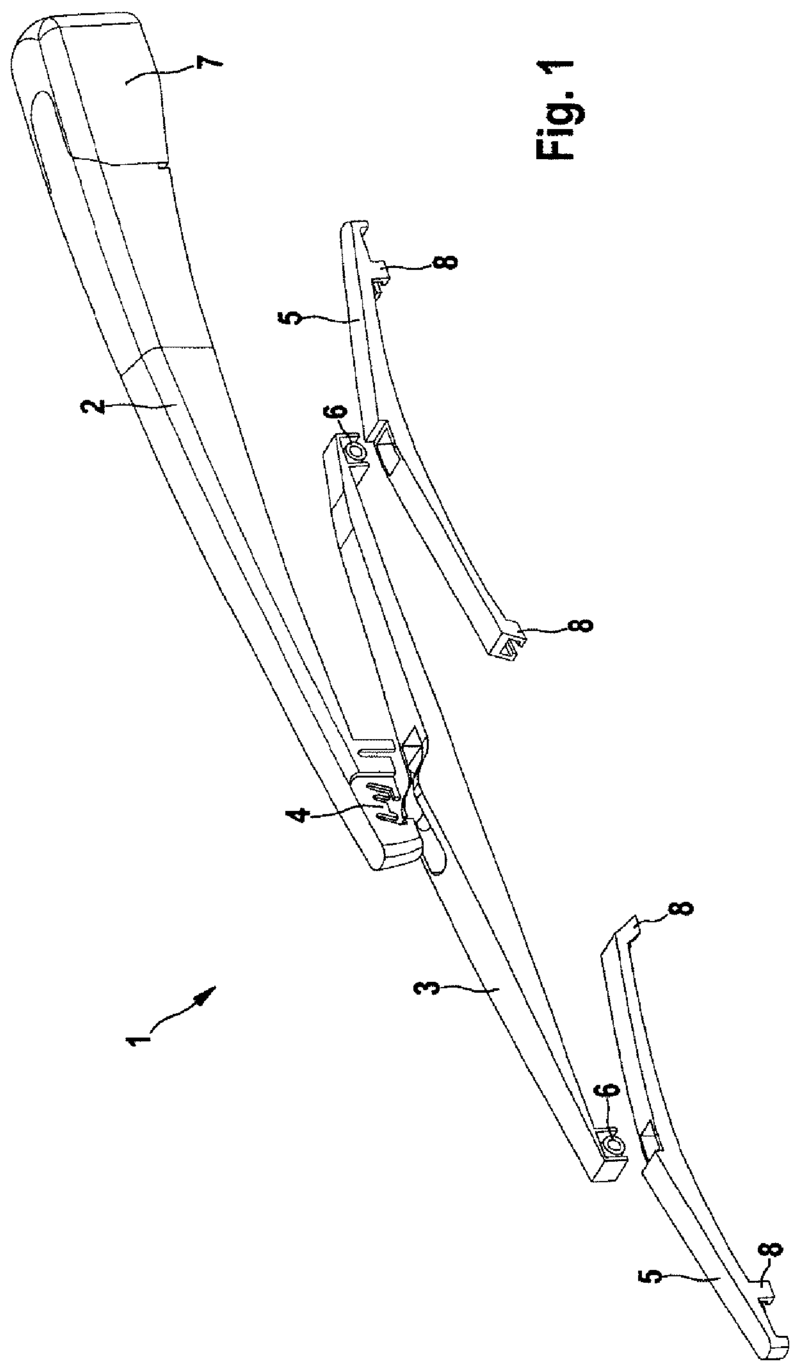
FIG. 1 shows a schematic exploded drawing of a wiper arm according to the invention.
Figure 2:
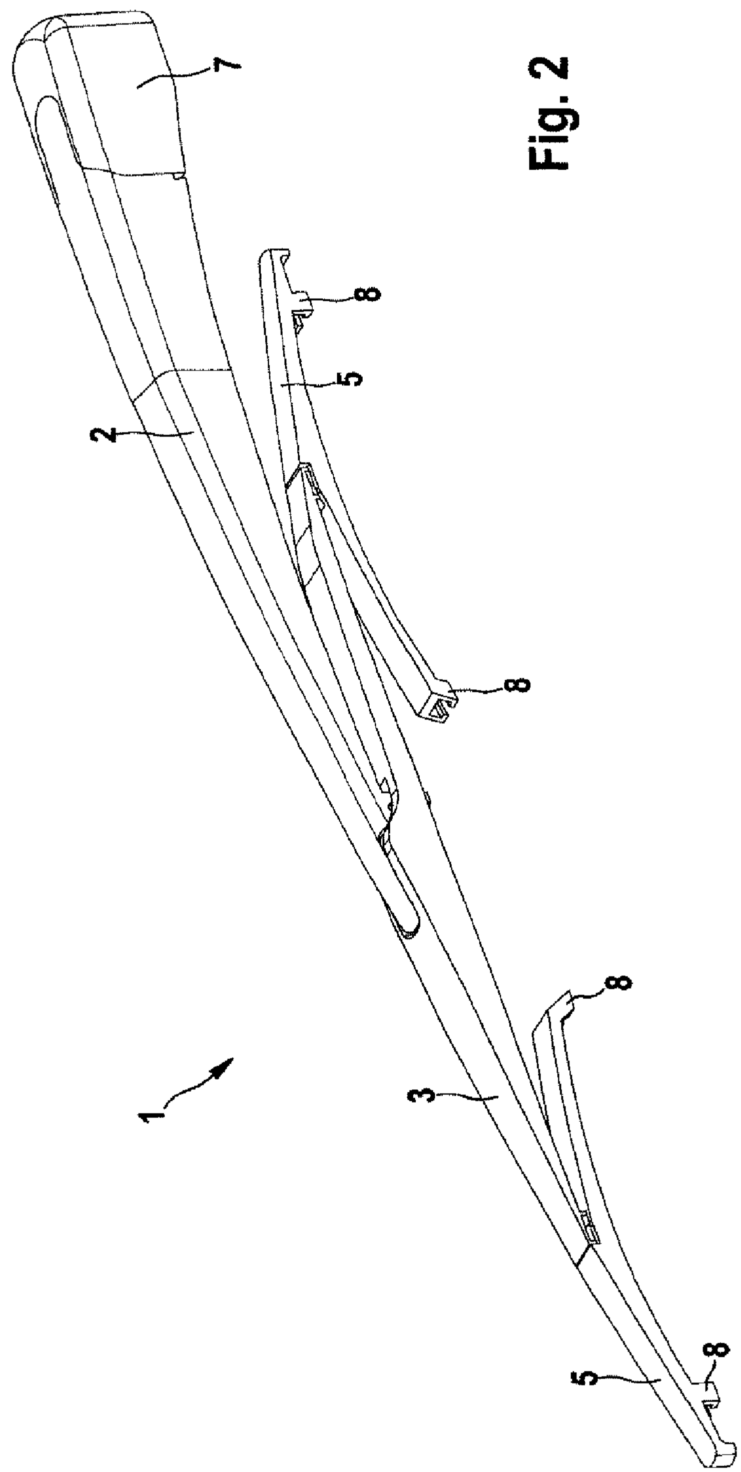
FIG. 2 shows the wiper arm according to FIG. 1, produced in an injection-molding cycle.

FIG. 1 shows an exploded drawing of a wiper arm 1 according to the invention, which has an upper arm portion 2 and a lower arm portion 3, which are movably connected to each other by way of a pivot pin 4. On the lower arm portion 3, two wiper blade holders 5 are movably connected to the lower arm portion 3 respectively by way of a pivot pin 6. At its free end, the upper arm portion 2 has a mount 7, in order to be able to fix the wiper arm 1 detachably to a wiper drive (not represented) of the window wiper device (likewise not represented). Before the wiper arm 1 is then fitted on the window wiper device, all that is then necessary is to insert wiper blades into the clips 8 provided for this purpose on the wiper blade holder 5.

The production of a ready-assembled two-component wiper arm 1 can be produced according to the invention completely in one injection-molding cycle. It is consequently possible to dispense with production of individual components in different injection molds on separate injection-molding machines, as is usually performed in the prior art, which apart from energy savings and material savings as a result of the possibility of omitting steel inserts, also leads to time saving on account of the no-longer-necessary assembly of the individual components.

In an exemplary embodiment of the present invention, for this purpose the wiper arm 1 is produced in a two-component injection-molding machine in a two-and-a-half-component assembly injection-molding process. In a first step, a first partial portion of the cavity of the two-component injection-molding machine is freed and a first material component—here a first thermoplastic material—is injected into the injection mold and thus forms the upper arm portion 2 of the wiper arm 1 as well as a mount 7, by way of which the wiper arm 1 can later easily be detachably fixed to a wiper drive of the window wiper device by a clip connection. In a second step, a second partial portion of the cavity is freed and a second material component in the form of a second thermoplastic material that is different from the first thermoplastic material is injected into the partial portion of the cavity partially delimited by the upper arm portion 2, in order to form the lower arm portion 3 of the wiper arm 1.

During the injection of the second thermoplastic material into the partial cavity, at the same time a pivot pin 4 formed on the upper arm portion 2 is encapsulated, so that a pivot is formed. As a result of the different shrinkage behavior of the two thermoplastic materials, the lower arm portion 3 is pivotably mounted on the upper arm portion with a clearance between the pivot-forming partners. The partial portions for the two wiper blade holders 5 are freed by a further core pulling movement in the injection mold, a delimitation of the partial portion being formed by the lower arm portion 3. For each wiper blade holder 5, a pivot pin 6 is respectively formed on the partial portion of the lower arm portion 3 that is facing the partial portion for the wiper blade holders 5, which pins are in turn encapsulated when a further thermoplastic material is injected.

In this exemplary embodiment, the thermoplastic material injected for the wiper blade holders 5 is the same plastic that was already used for the upper arm portion 2, so that a movable mounting of the wiper blade holders 5 on the lower arm portion 3 is also obtained at the pivot pins 6. Of course it is also possible to choose a third plastic that is different from the first and second thermoplastic materials as the material for the wiper blade holders 5. The injection-molding cycle is then completed after a cooling-down phase, so that the completely assembled wiper arm 1 can be removed from the injection mold.

The invention claimed is:

1. A wiper arm (1) for a window wiper device of a motor vehicle, with an upper arm portion (2), a lower arm portion (3) and at least one wiper blade holder (5), the upper arm portion (2) being pivotably connected to the lower arm portion (3) and the lower arm portion (3) being pivotably connected to the wiper blade holder (5), and with at least one mount (7), formed on the upper arm portion (2), for the detachable fixing of the wiper arm (1) to the window wiper device, characterized in that the upper arm portion (2) and the lower arm portion (3) as well as the wiper blade holder (5) are produced by means of a multi-component assembly injection-molding process, wherein the lower arm portion (3) and one of the upper arm portion (2) and the wiper blade holder (5) are formed from different types of thermoplastic materials that do not bond to each other during injection molding.

2. A wiper arm (1) according to claim 1, characterized in that the materials have different shrinkage properties such that a previously specified clearance of a fit and/or a width of a gap is/are obtained in pivoted connections between the upper arm portion (2) and the lower arm portion (3) and/or the lower arm portion (3) and the wiper blade holder (5).

3. A wiper arm according to claim 1 wherein the lower arm portion (3) and the upper arm portion (2) are formed from different types of thermoplastic materials that do not bond to each other during injection molding.

4. A wiper arm according to claim 3 wherein the lower arm portion (3) and the wiper blade holder (5) are formed from different types of thermoplastic materials that do not bond to each other during injection molding.

5. A wiper arm (1) for a window wiper device of a motor vehicle, with an upper arm portion (2), a lower arm portion (3)

and at least one wiper blade holder (5), the upper arm portion (2) being pivotably connected to the lower arm portion (3) and the lower arm portion (3) being pivotably connected to the wiper blade holder (5), and with at least one mount (7), formed on the upper arm portion (2), for the detachable fixing of the wiper arm (1) to the window wiper device, characterized in that the upper arm portion (2) and the lower arm portion (3) as well as the wiper blade holder (5) are made of plastic and are produced by means of a multi-component assembly injection-molding process, wherein the lower arm portion (3) and one of the upper arm portion (2) and the wiper blade holder (5) are formed from different types of thermoplastic materials, the materials having different shrinkage properties such that a previously specified clearance of a fit and/or a width of a gap is/are obtained in pivoted connections between the upper arm portion (2) and the lower arm portion (3) and/or the lower arm portion (3) and the wiper blade holder (5).

6. A wiper arm according to claim 5 wherein the lower arm portion (3) and the upper arm portion (2) are formed from different types of thermoplastic materials, the materials having different shrinkage properties.

7. A wiper arm according to claim 6 wherein the lower arm portion (3) and the wiper blade holder (5) are formed from different types of thermoplastic materials, the materials having different shrinkage properties.

* * * * *